E. E. SLICK.
VEHICLE WHEEL.
APPLICATION FILED FEB. 25, 1920.
1,414,437.
Patented May 2, 1922.
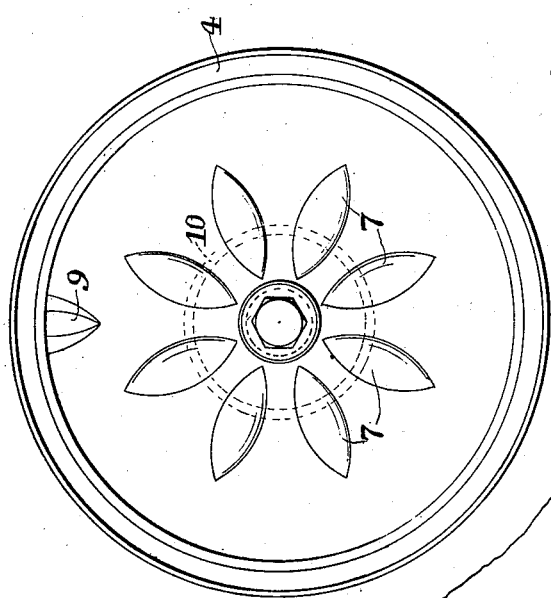
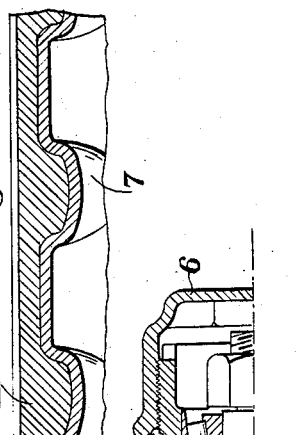
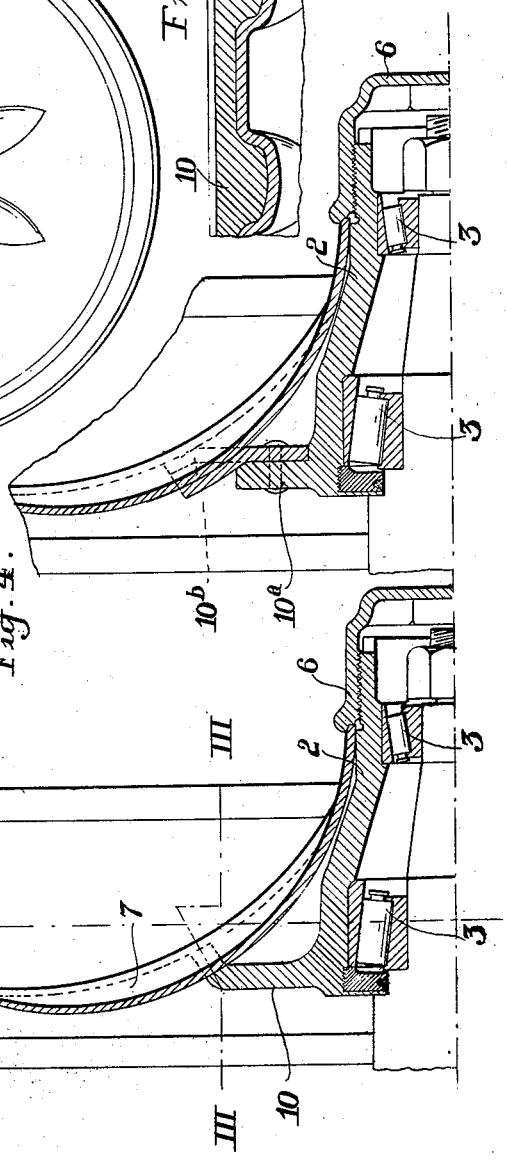
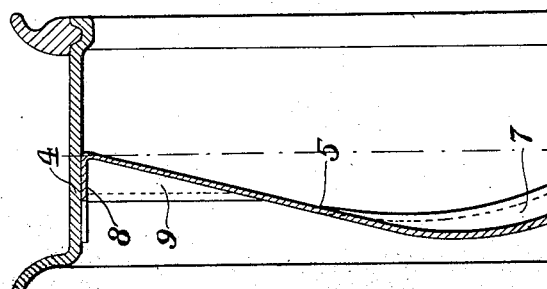
Inventor.
Edwin E. Slick,
by Bakewell, Byrnes & Parmelee
his attys.

UNITED STATES PATENT OFFICE.

EDWIN E. SLICK, OF PITTSBURGH, PENNSYLVANIA.

VEHICLE WHEEL.

1,414,437.   Specification of Letters Patent.   Patented May 2, 1922.

Application filed February 25, 1920. Serial No. 361,113.

*To all whom it may concern:*

Be it known that I, EDWIN E. SLICK, a citizen of the United States, residing at Pittsburgh, in the county of Allegheny and State of Pennsylvania, have invented a new and useful Improvement in Vehicle Wheels, of which the following is a full, clear, and exact description.

The present invention relates broadly to vehicle wheels, and more particularly to metallic wheels of this type particularly intended for use in connection with motor vehicles employing pneumatic or solid tires.

The principal object of the present invention is to provide a vehicle wheel having the main body thereof formed of a continuous disk.

Another object of my invention is to provide a wheel of this type, which is strong and durable in character, simple in construction, and well balanced.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a face view of a vehicle wheel embodying my invention.

Figure 2 is an enlarged radial section of the same.

Figure 3 is a developed section around a portion of the hub on the line III—III of Figure 2, and Figure 4 is a view similar to Figure 2, partly broken away, illustrating a modification.

Referring more particularly to the drawings, there is illustrated a vehicle wheel comprising a hub 2, which may be, in general, of any usual or suitable form having bearings 3. There is also provided a rim 4 of any usual construction which is connected to the hub by a sheet metal web or disk 5 having a central orifice through which the hub is sleeved. The web or disk 5, which is preferably produced from a suitably rolled shape or sheet of material, constitutes an important feature of the present invention.

The intermediate or main body portion of the disk or web is curved or dished inwardly to a point considerably inside of the center line of the rim, and is then brought outwardly and its peripheral portion secured to the rim. In some instances it is desirable to secure the peripheral portion to the rim adjacent the center line thereof, to provide a balanced construction. In its preferred form, the disk has its central portion extending outward substantially parallel to the axis of rotation of the wheel, and its peripheral portion substantially normal to said axis of rotation. The main intermediate body of the disk is preferably gently dished or curved outwardly, as described, from the central portion to the peripheral portion. Said central portion may be extended outwardly so that its edge portion is adapted to abut the inner end of the hub cap 6 when the latter is screwed into position.

The inwardly dished intermediate portion of the web is formed with a plurality of equally spaced radial reinforcements 7, of suitable shape, each gradually merging into the plane of the disk member. The web or disk is of greatest thickness at its central portion, its gauge being tapered down in thickness from the hub toward the rim. The peripheral edge portion 8 is flanged at substantially right angles to abut the inner surface of the rim to which it is directly secured, preferably by welding.

In order to provide for the valve stem, in case a pneumatic tire is mounted on the rim, the peripheral portion of the disk is deflected inwardly at 9, where the stem extends through the rim. The stem preferably extends through the rim on the side of the disk away from the vehicle so that easy access to the valve is insured.

The intermediate portion of the web or disk is supported by an abutting flange suitably carried by the shell of the hub 2. In the form shown in Figure 2, this abutment is formed by an integral circumferential flange 10 on said shell, while in the form shown in Figure 4, the shell of the hub is provided with a flange 10$^a$ to which is secured an abutment or supporting plate 10$^b$. The abutting face of the flange 10, or of the abutment 10$^b$, is contoured so as to continuously fit the contour of the adjacent portion of the disk, including the reinforcements 7 therein, as best shown in Figure 3. This contouring provides a positive driving connection between the hub and disk. At the same time, it permits the ready dismounting of the rim and web from the hub, if desired, by simply unscrewing and removing the hub cap 6.

The described construction is a very strong and simple one, the intermediate portion of the web being dished inwardly and its peripheral portion being brought outwardly and attached to the rim provides a well balanced construction.

It will be readily understood that my invention may be employed in connection with wheels having their rim and hub portions of different constructions from those illustrated; that the exact form and arrangement of the web reinforcements may be changed; and that the abutment for the dished portion of the web may be provided in other ways than those shown, all without departing from the spirit and scope of my invention as set forth in the appended claims.

I claim:

1. A vehicle wheel, comprising a continuous one-piece disk having a central portion extending outwardly substantially parallel to the axis of rotation of the wheel, a peripheral portion extending substantially normal to said axis of rotation, and an imperforate intermediate portion connecting said portions and curved gradually from the central portion to the peripheral portion, substantially as described.

2. A vehicle wheel, comprising a continuous one-piece disk having a central portion extending outwardly substantially parallel to the axis of rotation of the wheel, a peripheral portion extending substantially normal to said axis of rotation, an imperforate intermediate portion connecting said portions and curved gradually from the central portion to the peripheral portion, and means for reinforcing said intermediate portion only of the disk, substantially as described.

3. A vehicle wheel, comprising a disk having its central portion substantially parallel to the axis of rotation of the wheel, its peripheral portion substantially normal to said axis, and its intermediate portion gradually curved from said central portion to said peripheral portion, a hub, and means carried by said hub and detachably engaging one side only of said intermediate curved portion for driving and supporting said disk, said means providing unsupported disk portions on opposite sides thereof, substantially as described.

4. A vehicle wheel, comprising a rim, a hub, a cap for said hub, a disk intermediate said rim and hub, said disk having its central portion substantially parallel to the axis of rotation of the wheel to bring the edge thereof in position to be engaged by said cap when the parts are assembled, its peripheral portion substantially normal to said axis of rotation, its intermediate portion gradually curved from the central portion to the peripheral portion, and means for supporting said intermedite portion, substantially as described.

5. A vehicle wheel, comprising a rim, a hub, a cap for said hub, a disk intermediate said rim and hub, said disk having its central portion substantially parallel to the axis of rotation of the wheel to bring the edge thereof in position to be engaged by said cap when the parts are assembled, its peripheral portion substantially normal to said axis of rotation, its intermediate portion gradually curved from the central portion to the peripheral portion, means for supporting said intermediate portion, and reinforcements for said disk formed in said intermediate portion and extending beyond the opposite sides of said supporting means, substantially as described.

6. A vehicle wheel, comprising a rim, a hub, and a continuous one-piece metallic disk connecting the hub and rim, a hub cap having a seat at its inner end for the central edge portion of the disk, said disk having its intermediate portion curved gradually inwardly to a point beyond the center line of the rim and then brought outwardly to a point adjacent said center line at its peripheral edge, radial reinforcements for said intermediate portion, and an abutment detachably engaging said disk for supporting said intermediate reinforced portion only, said abutment being contoured to fit the disk, substantially as described.

7. A vehicle wheel, having a sheet metal disk connecting its rim and hub portions, said disk having its intermediate portion curved gradually beyond the center line of the rim, said curved portion having reinforcements extending thereacross and terminating short of the rim, the reinforcements merging into the plane of the disk in every direction, substantially as described.

8. A vehicle wheel comprising a rim, a hub, and a disk curved between its peripheral and central portions, said disk having an imperforate intermediate portion detachably supported on the hub at spaced points providing an unsupported portion therebetween, substantially as described.

9. A vehicle wheel, comprising a rim, a hub, a disk curved between its peripheral and central portions, said disk having an imperforate intermediate portion detachably supported on the hub at spaced points providing an unsupported portion therebetween, and reinforcements for said intermediate portion, said reinforcements extending uninterruptedly across one of said points of support, substantially as described.

10. A vehicle wheel, comprising a rim, a hub, a flange projecting from said hub, and a disk supported by contact only with said rim, hub and flange, whereby unsupported disk portions are provided between the hub and flange and between the flange and rim, substantially as described.

11. A vehicle wheel, comprising a rim, a hub, a flange projecting from said hub, a disk supported by contact only with said rim, hub and flange, whereby unsupported disk portions are provided between the hub and flange and between the flange and rim, and reinforcing means formed in the disk and extending beyond opposite sides of said flange, substantially as described.

12. A vehicle wheel, comprising a rim, a hub, a disk having a reinforced dished portion between its peripheral and central portions, the reinforcements terminating short of the rim, and a flange on said hub conforming to the contour of said reinforced dished portion for engaging only said dished portion and supporting the same to provide on unsupported disk portion between the flange and the hub, substantially as described.

13. A vehicle wheel, comprising a rim, a hub, a disk dished between its peripheral and central portions, a supporting flange on said hub engaging said disk to provide unsupported disk portions on opposite sides of said flange, substantially as described.

14. A vehicle wheel, comprising a rim, a hub, a disk dished between its peripheral and central portions, a supporting flange on said hub engaging said disk to provide unsupported disk portions on opposite sides of said flange, and reinforcements formed in the disk and extending across said flange beyond the opposite sides thereof, substantially as described.

In testimony whereof, I have hereunto set my hand.

EDWIN E. SLICK.